United States Patent [19]

Motonaga et al.

[11] Patent Number: 4,717,326
[45] Date of Patent: Jan. 5, 1988

[54] EXTRUSION MOLDING EQUIPMENT FOR MULTI-LAYER PARISON

[75] Inventors: Takao Motonaga; Keizi Fukuhara, both of Hiroshima; Tadashi Tamura, Yokosuka; Toshiji Yoshida, Yokohama, all of Japan

[73] Assignees: Mazda Motor Corporation, Hiroshima; Japan Steel Works, Tokyo, both of Japan

[21] Appl. No.: 922,668

[22] Filed: Oct. 24, 1986

[30] Foreign Application Priority Data

Oct. 25, 1985 [JP] Japan ................... 60-239155

[51] Int. Cl.$^4$ ............................................. B29C 47/86
[52] U.S. Cl. ................... 425/133.1; 425/144; 425/462; 425/466; 425/467
[58] Field of Search .............. 425/133.1, 462, 467, 425/466, 463, 131.1, 192 R, 523, 532, 143, 144; 264/173, 176.1

[56] References Cited

U.S. PATENT DOCUMENTS

| 3,321,803 | 5/1967 | Corbett | 425/192 X |
| 4,120,633 | 10/1978 | Feuerherm | 425/462 |
| 4,185,954 | 1/1980 | Murakami et al. | 425/462 |
| 4,297,092 | 10/1981 | Goron | 425/133.1 |
| 4,302,170 | 11/1981 | Goron | 425/133.1 |
| 4,422,838 | 12/1983 | Iwawaki et al. | 425/467 X |
| 4,472,129 | 9/1984 | Siard | 425/466 X |
| 4,512,943 | 4/1985 | Hahn et al. | 264/173 |
| 4,522,775 | 6/1985 | Briggs et al. | 264/173 |
| 4,565,515 | 1/1986 | Maier | 425/467 X |
| 4,578,025 | 3/1986 | Ando et al. | 264/173 X |

FOREIGN PATENT DOCUMENTS

| 2345049 | 3/1975 | Fed. Rep. of Germany ... 425/133.1 |
| 52-37026 | 9/1977 | Japan . |
| 58-220738 | 12/1983 | Japan . |
| 60-187513 | 9/1985 | Japan . |

*Primary Examiner*—Richard L. Chiesa
*Attorney, Agent, or Firm*—Burns, Doane, Swecker & Mathis

[57] ABSTRACT

Extrusion molding equipment for a multi-layer parison which includes an accumulator head, a cylindrical member disposed in the accumulator head and having a temperature control device for controlling a chief resin material temperature wise, a ringed piston reciprocable along the inner peripheral surface of the cylindrical member, a core member coaxially disposed inside the ringed piston and at least one ringed member coaxially disposed within an annular resin passage defined between the cylindrical member and the core member, into which resin passage the chief resin material is forcibly supplied from an accumulator composed of the ringed piston and a hydraulic cylinder operating the ringed piston, with one or more annular nozzles being defined in the ringed member for extruding one or more auxillary resin materials.

14 Claims, 5 Drawing Figures

EXTRUSION MOLDING EQUIPMENT FOR MULTI-LAYER PARISON

BACKGROUND OF THE INVENTION

The present invention generally relates to molding equipment and more particularly, to extrusion molding equipment for molding a multi-layer parison having a plurality of resin layers laminated therein by the use of an extrustion molding technique.

Conventionally, although a hollow article of a resin material is generally formed through a blow molding process in which a pressurized gas is blown into a parison inserted into a set of molds, a multi-layer parison having a plurality of resin layers laminated therein has been occasionally employed in the blow molding process so as to complement insufficient properties for a molded product of a single resin material.

In case of a fuel tank made of a resin material such as high-density polyethylene, for example, since there has been a problem of a gasoline permeation in which the gasoline stored within the tank permeates the outside therethrough, the Japalnese Patent Laid-Open Application (Tokkaisho) No. 58-220738 discloses the hollow article having a plurality of resin layers laminated therein and formed from the parison by the use of the blow molding technique so as to deal with this kind of problem. More specifically, the aforementioned tank is formed, through the blow molding process, from the multi-layer parison in which a nylon resin layer for preventing the gasoline from permeating therethrough is so bonded with an inner resin layer and an outer resin layer of the high-density polyethylene as to be securely held therebetween through each of adhesive layers and accordingly, a wall of the tank is constructed by five resin layers of three kinds of resin materials in the order of a high-density polyethylene resin layer, an adhesive layer, a nylon resin layer, an adhesive layer and a high-density polyethylene resin layer in a direction from inside towards outside of the tank wall.

On the other hand, one of known extrusion molding equipment for molding the multi-layer parison as described above is disclosed, for example, in the Japanese Patent Publication (Tokkosho) No. 52-37026 in which there are formed a plurality of cylindrical resin storing spaces by arranging a cylindrical member having a temperature control means therein within a molding head in a layered state and not only a plurality of extruders are so disposed as to communicate respective resin storing spaces for extruding the resin materials thereinto, but also a plurality of ringed pistons are also disposed within respective resin storing spaces for extruding the resin materials therefrom.

The Japanese Patent Laid-Open Application (Tokkaisho) No. 60-187513 discloses a multi-layer preform having an inner layer and an outer layer of a chief resin material, and an intermediate layer composed of a gas barrier resin layer and disposed between the inner and outer layers of the chief resin material. Although the multi-layer preform includes a plurality of the aforementioned layers approximately constant in total thickness, the gas barrier resin layer is caused to vary in thickness in a lengthwise direction of the multi-layer preform. This kind of the multi-layer preform has been generally formed by such an arrangement that a ringed member communicating an injection unit for forcibly extruding the gas barrier resin injected from the injection unit is disposed in an annular resin passage for the chief resin material.

In the conventional extrusion molding equipment as described above, when the multi-layer parison having the five layered construction of three kinds of the resin materials is formed in a manner that the resin layers of auxiliary resin materials composed of the nylon resin layer and the adhesive layers are laminated with each other between the inner and outer layers of the chief resin material corresponding to the high-density polyethylene layers, not only a plurality of the resin storing spaces are necessarily formed for respective inner and outer layers of the chief resin material, but also as many accumulators as the resin storing spaces are required for extruding the resins from the resin storing spaces and accordingly, the extrusion molding equipment has been manufactured disadvantageously in a large size.

Furthermore, although the resin materials stored in respective resin storing spaces are to be controlled in storage temperature by the temperature control means disposed in the cylindrical member, it is substantially impossible to steadily control the temperature of the resin materials due to the fact that the resin storing spaces are formed closely and exert a thermal influence to each other, thus resulting in that a defect such as an imperfect bonding between adjacent resin layers or the like has been disadvantageously taken place in the multi-layer parison.

In addition, unless an extrusion system forcibly extruding the chief resin material is provided with one or more ringed pistons, it is substantially impossible to subject the material to an extrusion pressure evenly acting on whole extrusion surface thereof and to obtain a uniform extrusion speed thereof in case of the extrusion of the material, thus undesirably resulting in that it is remarkably difficult to unify a thickness distribution of the inner and outer layers in a circumferential direction thereof or to obtain a required thickness distribution thereof due to a production of the parison having a partiality in thickness distribution.

Even if the extrusion system is provided with one or more ringed pistons, in the case where the extrusion system is caused to communicate the annular resin passage by way of a confluent conduit, as shown in the aforementioned Application No. 60-187513, a stream of the resin material is subjected to be disturbed and accordingly, it is also difficult to obtain the uniform or the required thickness distribution of respective resin layers.

SUMMARY OF THE INVENTION

Accordingly, the present invention has been developed with a view to substantially eliminating the above described disadvantages inherent in the prior art extrusion molding equipment, and has for its essential object to provide improved extrusion molding equipment of a small size which is capable of extrusion-molding a multi-layer parison having one or more auxiliary resin layers laminated between the inner and outer layers of a chief resin material, by arranging a single accumulator for extruding the chief resin material and by defining a single resin storing space therefor, since the chief resin material is divided into two of the inner and outer layers by a ringed member disposed within a resin passage and one or more auxiliary resin materials are forcibly extruded between the inner and outer layers of the chief resin material from nozzles formed in the ringed member.

Another important object of the present invention is to provide extrusion molding equipment of the above described type which is free from such a defect as a imperfect bonding between adjacent resin layers in the multi-layer parison, since each of the resin materials can be easily and steadily controlled in storage temperature due to the fact that the resin storing space for the chief resin material and those for the auxiliary resin materials can be disposed away from each other so as not to affect any thermal influence to each other.

In accomplishing these and other objects, according to one preferred embodiment of the present invention, there is provided extrusion molding equipment for a multi-layer parison which includes an accumulator head, a cylindrical member disposed in the accumulator head and having a temperature control device for controlling a chief resin material in temperature, a ringed piston reciprocable along the inner peripheral surface of the cylindrical member, a core member coaxially disposed inside the ringed member and at least one ringed member coaxially disposed within an annular resin passage defined between the cylindrical member and the core member, into which resin passage the chief resin material is forcibly supplied from an accumulator composed of the ringed piston and a hydraulic cylinder operating the ringed piston, with one or more annular nozzles being defined in the ringed member for extruding one or more auxiliary resin materials.

By the arrangement according to the present invention as described above, since the annular resin storing space is defined between side members such as the cylindrical member, the core member or the like and the ringed piston is disposed within the resin storing space, it has become possible to subject the chief resin material to an extrusion pressure evenly acting on whole extrusion surface thereof and to obtain a uniform extrusion speed thereof, when the material is extruded from the resin storing space. Furthermore, since the chief resin material is directly extruded into the resin passage from the resin storing space by cuasing both of them to directly communicate each other, the resin material is prevented from being disturbed in the course of a stream thereof.

BRIEF DESCRIPTION OF THE DRAWINGS

These and other objects and features of the present invention will become apparent from the following description taken in conjunction with the preferred embodiment thereof with reference to the accompanying drawings, throughout which like parts are designated by like reference numerals, and in which.

DETAILED DESCRIPTION OF THE PREFERRED EMBODIMENT

Figure 1:
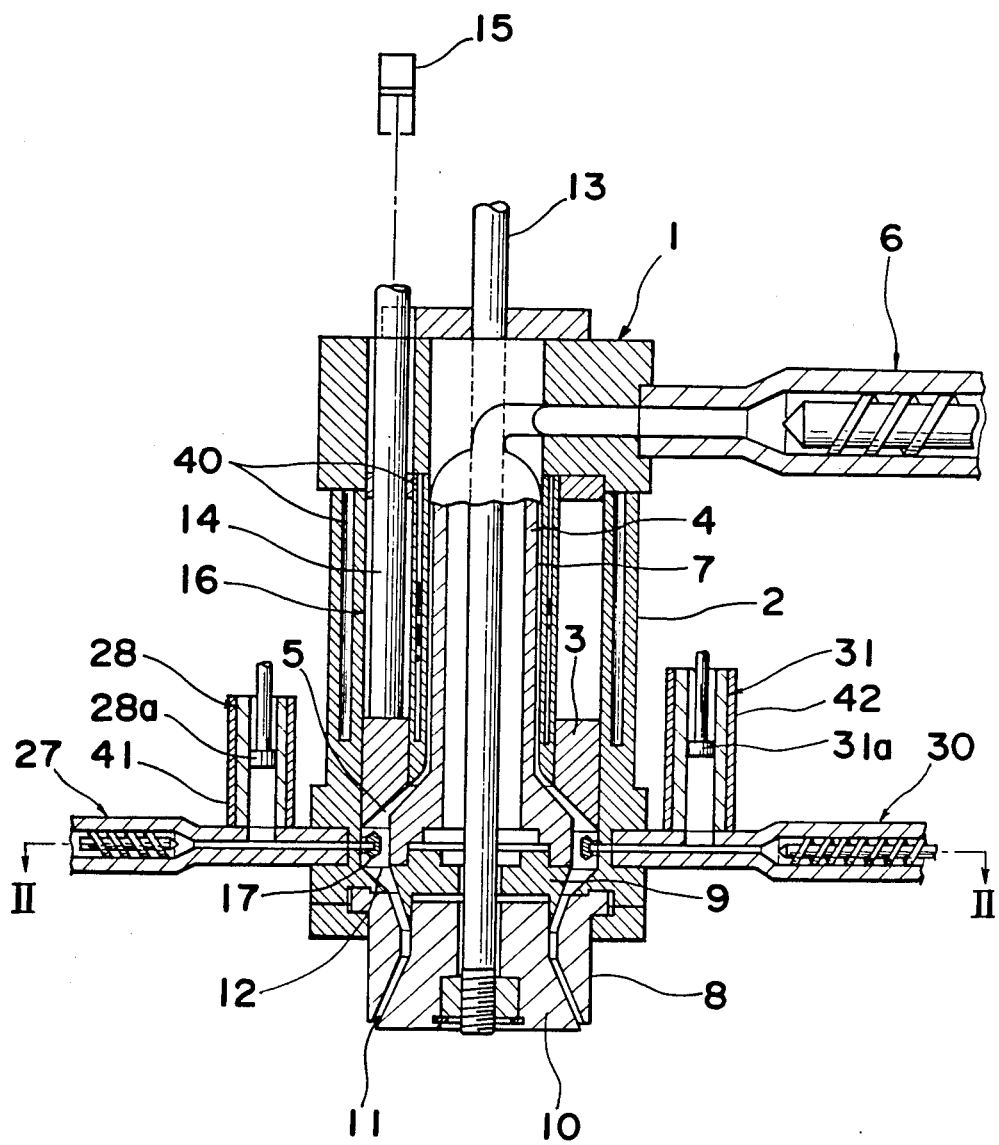
FIG. 1 is a vertical sectional view of an extrusion molding equipment showing a general construction thereof according to one preferred embodiment of the present invention.

Referring now to the drawings, FIG. 1 illustrates a general construction of extrusion molding equipment for a multi-layer parison according to one preferred embodiment of the present invention. The extrusion molding equipment is provided with an accumlator head 1, a cylindrical member 2 disposed at the lower half portion of the accumulator head 1, a ringed piston 3 reciprocable up and down along the inner peripheral surface of the cylindrical member 2 and a first core 4 fixedly mounted on the cylindrical member 2 at the central portion of the accumulator head 1 so as to penetrate the ringed piston 3. A resin storing space 5 internally accommodating the ringed piston 3 is defined between the cylindrical member 2 and the first core 4 in order that a chief resin material sequentially extruded from a first extruder 6 in a melting state is supplied into the resin storing space 5 by way of a cylindrical passage 7 communicating the first extruder 6. The chief resin material stored in the resin storing space 5 is controlled temperature-wise by a first temperature control device 40 in which a plurality of rod heaters or the like are spaced at predetermined intervals in a peripheral direction of the cylindrical member 2.

An annular die 8 is coaxially disposed with respect to the cylindrical member 2 at the lower end portion thereof and is fixedly mounted thereon. A second core 10 also coaxially disposed with respect to the die 8 is engaged with an annular core support 9 at the central portion thereof so as to be reciprocable in a vertical direction thereof, with the core support 9 being securely mounted on the first core 4 at the lower end portion thereof. Both of the die 8 and the second core 10 are conically formed at the inner peripheral surface of the lower end portion of the former and at the outer peripheral surface of the lower end portion of the latter, to form an annular die slit 11 therebetween. The die slit 11 communicates the aforementioned resin storing space 5 through an annular resin passage 12 defined by the cylindrical member 2, the die 8, the first core 4 and the core support 9.

The second core 10 is reciprocably moved in a vertical direction by a hydraulic cylindrical member (not shown) through a rod 13 in order that the die slit 11 defined between the die 8 and the second core 10 can be controlled in its width, e.g. in its thickness in a radial direction thereof. The ringed piston 3 is downwardly moved by a single-acting hydraulic cylindrical member 15 through a rod 14, and the chief resin material stored within the resin storing space 5 is forcibly fed to the die slit 11 by way of the resin passage 12 from a first accumulator 16 composed of the hydraulic cylindrical member 15 and the ringed piston 3.

Figure 2:
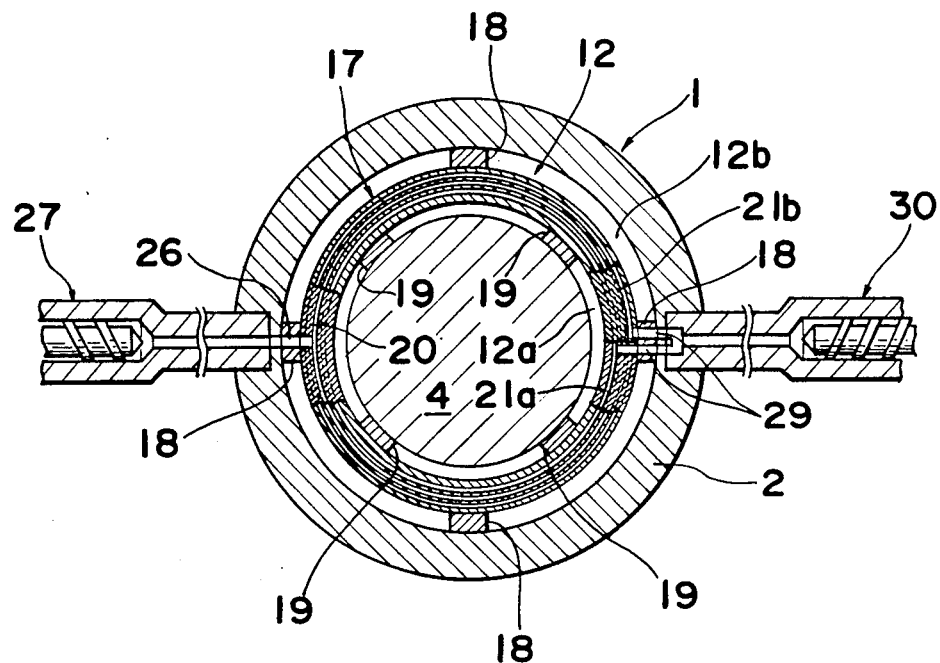
FIG. 2 is a cross section on an enlarged scale, taken along the line II—II of FIG. 1.
Figure 3:
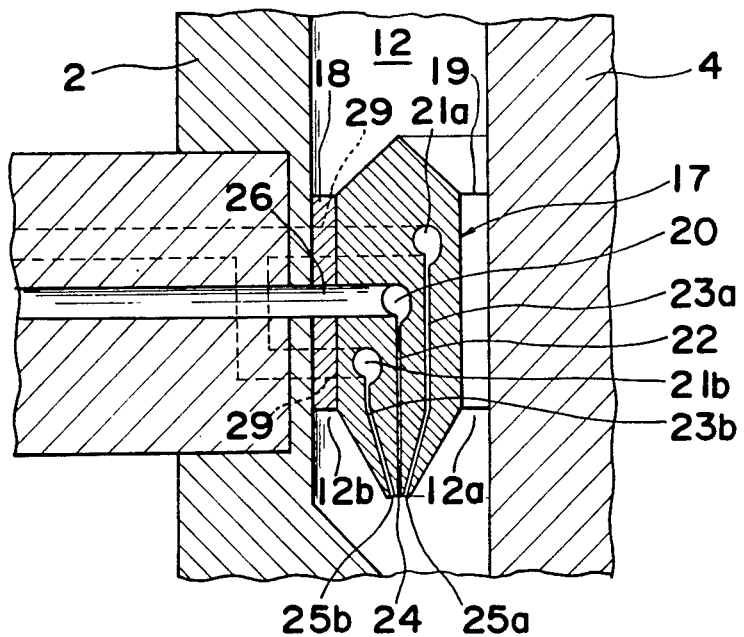
FIG. 3 is a cross sectional view of the main portion of FIG. 1, on an enlarged scale.

As shown in FIGS. 2 and 3, a ringed member 17 having a cross section approximately similar to that of an elongated hexagon is coaxially disposed in the resin passage 12. The ringed member 17 is securely supported from the inner peripheral surface of the cylindrical member 2 through four pieces of first support members 18 spaced at regular intervals, and from the outer peripheral surface of the first core 4 through four pieces of second support members 19 also spaced at regular intervals at positions different from those of the first support members 18 in a circumferential direction. The resin passage 12 is divided by the ringed member 17 into two portions such as an inside annular passage 12a and an outside annular passage 12b. The ringed member 17 is internally provided with an annular resin conduit 20 for barrier resin formed substantially at the central portion thereof and two of annular resin conduits 21a and 21b for adhesive resin formed on respective sides of the barrier resin conduit 20, and these resin conduits 20, 21a and 21b communicate three of coaxially defined annular injection openings such as nozzles 24, 25a and 25b formed at the lower portions of the ringed member 17, respectively by way of annular slits 22, 23a and 23b.

The barrier resin conduit 20 is caused to communicate a second extruder 27 disposed outside the accumulator head 1, by way of a conduit 26 defined in one of the first support members 18 arranged between the ringed member 17 and the cylindrical member 2. A second accumulator 28 is arranged at the forward end of the second extruder 27 for temporarily storing therein the barrier resin in the melting state sequentially extruded from the second extruder 27 and for injecting the resin by operating a piston 28a. The second accumulator 28 is provided with a second temperature control device 41 which is so formed as to enclose the outer peripheral surface of the second accumulator 28 in the form of a cylindrical heater or the like for controlling the resin stored therein in temperture. Both of the adhesive resin conduits 21a and 21b are caused to communicate a third extruder 30 disposed outside the accumulator head 1, by way of a conduit 29 defined in another one of the first support members 18 arranged between the ringed member 17 and the cylindrical member 2. A third accumulator 31 is also arranged at the fore end of the third extruder 30 for temporarily storing therein the adhesive resin sequentially extruded from the third extruder 30 and for injecting the resin by operating a piston 31a. In the same manner as the second temperature control device 41, a third temperature control device 42 is so disposed on the third accumulator 31 as to enclose the outer peripheral surface thereof in the form of a cylindrical heater or the like for controlling the resin stored therein temperature-wise.

Subsequently, functioning of the extrusion molding equipment for the multi-layer parison having the construction as described so far will be explained hereinafter.

In case of the normal operation of the equipment, each of the ringed piston 3 in the accumulator head 1 and the pistons 28a and 31a in the second and third accumulators 28 and 31 is caused to be freely movable. Accordingly, in the accumulator head 1, the chief resin material led into the resin storing space 5 by being extruded from the first extruder 6 is stored within the resin storing space 5, while raising the ringed piston 3. In the same manner, the barrier resin and the adhesive resin of auxiliary resin materials respectively extruded from the second and third extruders 27 and 30 are stored in the second and third accumulators 28 and 31, while raising the pistons 28a and 31a disposed in respective accumulators 28 and 31.

Thereafter, when each of the resin materials is stored in a predetermined amount, the ringed piston 3 in the accumulator head 1 and the pistons 28a and 31a in respective accumulators 28 and 31 are simultaneously lowered. Thus, the chief resin material within the resin storing space 5 is forcibly fed towards the annular resin passage 12 and the barrier resin within the second accumulator 28 is forcibly fed towards the nozzle 24 through the resin conduits 26 and 20, and likewise, the adhesive resin within the third accumulator 31 is also forcibly fed towards the nozzles 25a and 25b through the resin conduits 29, 21a and 21b.

At this moment, since the aforementioned resin passage 12 is divided by the ringed member 17 into the inner annular passage 12a and the outer annular passage 12b, the chief resin material passing through the resin passage 12 is caused to be divided into an inner layer and an outer layer by the ringed member 17. Furthermore, the barrier resin and the adhesive resin are injected from respective nozzles 24 and 25a, 25b defined at the lower portion of the ringed member 17 between the inner and outer layers of the chief resin material. The resins injected from the nozzles 24, 25a and 25b are formed into a cylindrical body having a barrier resin layer at the central layered portion thereof and a set of adhesive layers formed on both of the inner and outer surfaces of the barrier resin layer. The inner and outer resin layers of the chief material which tend to unite with each other after having passed the ringed member 17 are caused to be bonded onto the inner and outer surfaces of the barrier resin layer formed in the cylindrical body through respective adhesive layers.

In the above described manner, the melted resin laminated in the resin passage 12 is injected through the die slit 11 of a small width such that each of the resin layers are securely bonded to each other to form the cylindrical body having a predetermined thickness, thus resulting in that it is capable of obtaining the multi-layer parison having a construction of three kinds of five layered resin materials, in which the central barrier layer is sandwiched between both of the inner and outer layers of the chief resin material through each one of the adhesive layers.

In the extrusion molding equipment for the multi-layer parison according to this embodiment, since the multi-layer parison having the construction of three kinds of five layered resin materials can be obtained in the above described manner, it is sufficient to form only one resin storing space 5 and to arrange only one accumulator 16 of the ringed piston type for both of the inner and outer layers of the chief resin material without any requirement of a plurality of the resin storing spaces and the accumulators, thus resulting in that the extrusion molding equipment can be formed in a small size.

Moreover, since the second and third accumulators 28 and 31 respectively storing therein the barrier resin and the adhesive resin are disposed outside the accumulator head 1 storing the chief resin material in the resin storing space 5 formed therein, all of the resin materials can be easily and steadily controlled temperature-wise without any thermal affection to each other, when the resin materials are independently controlled in storage temperature-wise by respective temperature control devices. As a result, since plural kinds of the resin materials having different melting temperatures can be employed in the extrusion molding equipment of the present invention, not only the equipment having general-purpose properties can be obtained, but also a bond strength produced between the chief resin material and the barrier resin can be increased by keeping the adhesive resin to be superior in adhesive properties and consequently, it is capable of preventing such a defect as an imperfect bonded state between adjacent resin layers in the multi-layer parison.

It is to be noted here that the present invention is not limited by the above described embodiment, but includes various kinds of modifications.

Figure 4:
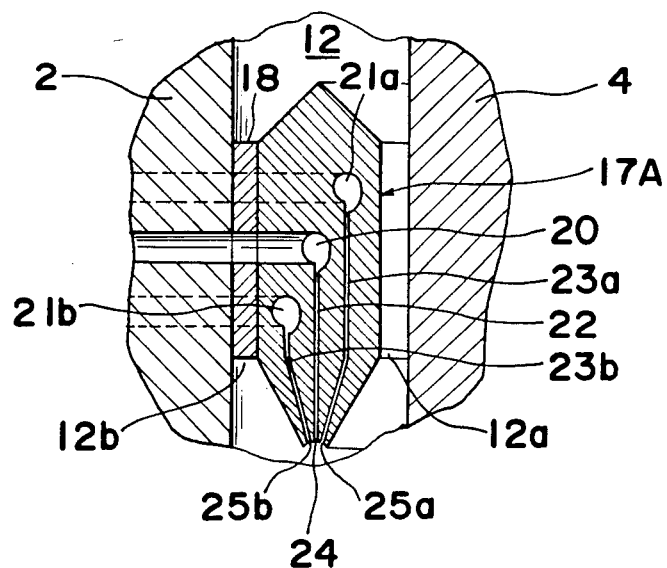
FIGS. 4 and 5 are views similar to FIG. 3, which particularly show modifications thereof.

FIG. 4 illustrates one of the modifications of the present invention, in which although a plurality of nozzles 24 and 25a, 25b for injecting the barrier resin and the adhesive resin respectively are formed in the ringed member 17A in the similar manner as the above described embodiment, the lower end portion of the ringed member 17A is formed in a concaved circular arc state in cross section in order that the resin materials injected from the nozzles 24, 25a and 25b are smoothly so converged with each other so as to form the barrier resin as the central layer.

Figure 5:
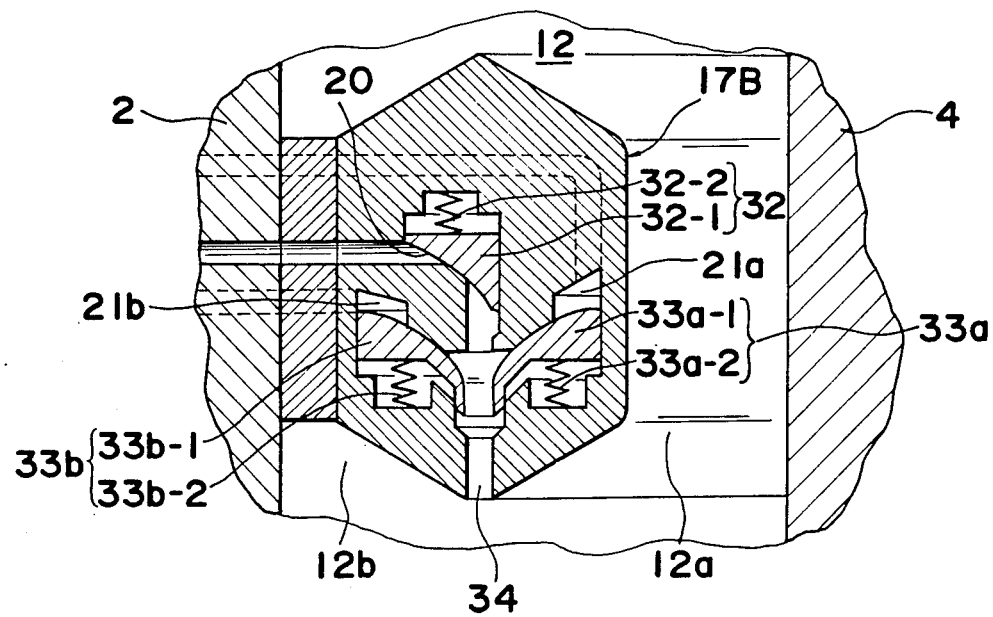

FIG. 5 illustrates another one of the modifications of the present invention, which is provided with a check valve 32 and a set of check valves 33a and 33b respectively disposed in the resin conduit 20 for barrier resin and in the resin conduits 21a and 21b for adhesive resin, both of which conduits are formed in the ringed member 17B, and the check valves 32, 33a and 33b have functions for stopping the supply of the resin materials remaining within the resin conduits 20, 21a and 21b respectively in the case where the pistons in respective accumulators are not in operation. Each of the check valves 32, 33a and 33b includes a valve body 32-1, 33a-1 or 33b-1 and a spring 32-2, 33a-2 or 33b-2 for urging the valve body 32-1, 33a-1 or 33b-1 to close each of the resin conduits 20, 21a and 21b. The resin materials supplied through the check valves 32, 33a and 33b are formed into the cylindrical body within the ringed member 17B in advance, with the cylindrical body having the barrier resin layer as the central layer thereof and a set of the adhesive layers formed on respective surfaces of the barrier resin layer, and thereafter, the resin materials in the form of the cylindrical body are injected from an annular nozzle 34 formed at the lower portion of the ringed member 17B.

In either of the above described embodiments, although the barrier resin layer is formed between the inner and outer layers of the chief resin material on the assumption that a molded product to be obtained accommodates, like a fuel tank, a gasoline or the like having a permeability with resepct to the resin materials, the molded products other than the aforementioned one may be provided with the central resin layer of the auxiliary resin material having the other function, for example, for increasing the molded products in strength. In this case, if the adhesive layers are not necessarily required due to the fact that the auxiliary resin material has adhesive properites with respect to the chief resin material, the number of the resin conduits and the nozzles formed in the ringed member can be reduced to be respectively only one. On the contrary, the multi-layered parison having a greater number of the resin layers can be molded by increasing the number of the resin conduits and the nozzles to be formed in the ringed member.

It is to be noted that in the extrusion molding equipment according to either of the above described embodiments, although the auxiliary resin layers such as the barrier resin layer and the adhesive layers are collectively supplied in the form of the cylindrical body between the inner and outer layers of the chief resin material by arranging the ringed member 17 at the central portion of the resin passage 12, the prsent invention is not limited by this construction and is applicable in such a construction that one or more auxiliary resin layers are laminated on the inner, the outer or respective surfaces of the chief resin layer. In this case, the chief resin material may be caused to flow by way of any one of the outer and inner annular resin passages 12b and 12a by arranging the ringed member 17 so as to closely adhere to an inner or an outer wall surface of the resin passage 12, that is, the outer peripheral surfaces of the first core 4 or the inner peripheral surface of the cylindrical member 2, or the chief resin material may be caused to flow through between two of the ringed members 17 which have been respectively so arranged as to closely adhere to the outer peripheral surface of the first core 4 and the inner peripheral surface of the cylindrical member 2.

It is also to be noted that since the auxiliary resin materials such as the barrier resin and the adhesive resin are supplied usually in such an extremely small amount as apprpoximately 5 to 15 with respect to 100 of the chief resin material in volume ratio, the accumulators 28 and 31 are not necessarily required to supply the aforementioned resins, as explained in the above described embodiments and it may be so constructed that the auxilairy resin materials are intermittently supplied by such means as an ON-OFF control of the rotational movement of screws disposed in respective extruder 27 and 30 or a control of the reciprocating movement thereof.

It should be further noted that burrs can be advantageously repeatedly utilized by such a construction the the upper and lower end portions of the parision corresponding to pinch-off portions held between a set of molds is composed of single chief resin layer by stopping the supply of the auxiliary resin materials such as the barrier resin, adhesive resin or the like.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. Extrusion molding equipment for molding a multi-layer parison, which comprises:
    an accumulator head;
    a cylindrical member disposed in such accumulator head and having therein a first temperature control means for controlling a chief resin material temperature-wise;
    a ringed piston reciprocal along the inner peripheral surface of said cylindrical member for further extruding said chief resin material extruded from an extruding means;
    a first core member coaxially disposed inside said ringed piston;
    said cylindrical member and said first core member cooperating together to define therebetween an annular resin storing space internally accommodating said ringed piston;
    an annular die coaxially and securely mounted on said accumulator head at the lower endportion thereof;
    a second core member coaxially and reciprocably engaged with said first core member at the lower end portion thereof;
    said cylindrical member, said die and said first core member cooperating together to define an annular resin passage directly communicating said resin storing space at the downstream side thereof, into which resin passage said chief resin material is forcibly extruded by said ringed piston; and
    at least one ringed member coaxially disposed within said resin passage and having at least one injection opening defined therein, which opening communicates an extruding means for extruding an auxiliary resin material, with a second temperature control means for controlling said auxiliary resin material temperature-wise being arranged in the vicinity of said extruding means and away from said first temperature control means.

2. The extrusion molding equipment as claimed in claim 1, wherein said ringed member is disposed at the central portion of said resin passage.

3. The extrusion molding equipment as claimed in claim 2, wherein said ringed member is formed into a tapered state both at the upper and lower portions thereof.

4. The extrusion molding equipment as claimed in claim 2, wherein a barrier resin conduit and a set of adhesive resin conduits on the inner and outer sides of said barrier resin conduit are defined in said ringed member and independently communicate respective injection openings.

5. The extrusion molding equipment as claimed in claim 4, wherein said adhesive resin is forcibly supplied by a single extruding means towards said resin passage through a set of said adhesive resin conduits and said respective injection openings.

6. The extrusion molding equipment as claimed in claim 2, wherein a barrier resin conduit and a set of adhesive resin conduits on the inner and outer sides of said barrier resin conduit are defined in said ringed member and joined together into one common conduit communicating a single injection opening.

7. The extrusion molding equipment as claimed in claim 3, wherein said adhesive resin is forcibly supplied by a single extruding means towards said resin passage through a set of said adhesive resin conduits and said injection opening.

8. The extrusion molding equipment as claimed in claim 1, wherein said ringed member is caused to closely adhere to at least one side of the inner and outer wall surfaces of said resin passage.

9. The extrusion molding equipment as claimed in claim 1, wherein a plurality of resin conduits are defined in said ringed member and joined together into one common conduit communicating a single injection opening.

10. The extrusion molding equipment as claimed in claim 9, further comprising a plurality of check valves respectively disposed in said resin conduits.

11. The extrusion molding equipment as claimed in claim 1, wherein a plurality of resin conduits are defined in said ringed member and independently communicate respective injection openings.

12. The extrusion molding equipment is claimed in claim 11, wherein the lower end portion of said ringed member is formed in a concaved circular arc state in cross section.

13. The extrusion molding equipment as claimed in claim 1, wherein said side and said second core member are movable with respect to each other.

14. The extrusion molding equipment as claimed in claim 1, further comprising at least one accumulator means in the vicinity of said extruding means, wherein said temperature control means is so disposed as to enclose said accumulator means and said auxiliary resin material is extruded by said extruding means through said accumulator means.

* * * * *